Sept. 30, 1941.　　　　M. LICHTER　　　　2,257,505

CORNCOB HOLDER

Filed Sept. 7, 1940

INVENTOR
Malvin Lichter
BY Samuel Ostrolenk

Patented Sept. 30, 1941

2,257,505

UNITED STATES PATENT OFFICE 2,257,505

CORNCOB HOLDER

Malvin Lichter, New Rochelle, N. Y.

Application September 7, 1940, Serial No. 355,803

6 Claims. (Cl. 294—5)

This invention relates to advertising novelties, and more particularly, to a corn cob holder having a handle formed of paper or other fibrous material and having a tine or prong embedded in or held by the fibrous material.

In the manufacture and construction of advertising novelties of various kinds, it is of extreme importance that the novelty provide adequate space for printed advertising matter, while, at the same time, having sufficient utility to make the use thereof desirable, and thus ensure wide distribution.

One of the prime requisites, however, is that the construction be simple and inexpensive, so that quantity manufacture and distribution of the novelties may be made possible. Preferably, construction of the device should be such as to enable the advertiser to simply give the novelties away or provide them for distribution at a nominal cost.

In accordance with the foregoing principles, I have devised a novel corn cob holder which consists of a fibrous sheet, preferably laminar, having embedded therein a tine or prong which projects beyond one edge thereof. Preferably the tine or prong may be formed by embedding a simple nail in the laminar sheet. The entire device may be used as a corn cob holder.

The laminar sheet provides a manual grasping portion, the tine or prong being insertable in one end of a corn cob, in order to secure the handle or manual grasping portion of the device thereto. Where two such members are used, one at each end of a corn cob, it will be obvious that a simple corn cob holder arrangement will be provided.

An object of this invention, therefore, is the construction of a corn cob holder having a handle portion of fibrous sheet or paper material and a tine or prong embedded therein.

Another object of the present invention is to provide a simple corn cob holder having a handle portion of fibrous material preferably of paper with a nail embedded therein to provide a suitable tine or prong.

Still another object of the present invention is to provide a simple corn cob holder having a handle made of laminated fibrous material with a nail embedded in the central laminations and the outer laminations forming covering sheets.

A further object of the present invention is the construction and formation of a simple advertising novelty in the form of a corn cob holder having a construction and formation adapting it for quantity distribution at nominal cost. These and many other objects of the present invention will in part be apparent and in part pointed out in the following description and drawing in which.

Figure 1:
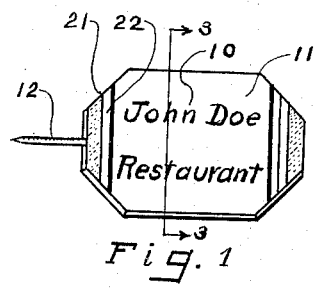
Figure 1 is a plan view of a corn cob holder formed in accordance with my invention.
Figure 2:
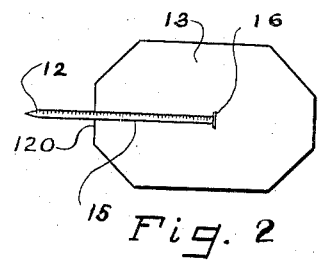
Figure 2 is a view corresponding to that of Figure 1 with one of the covering laminations removed.
Figures 3, 4:
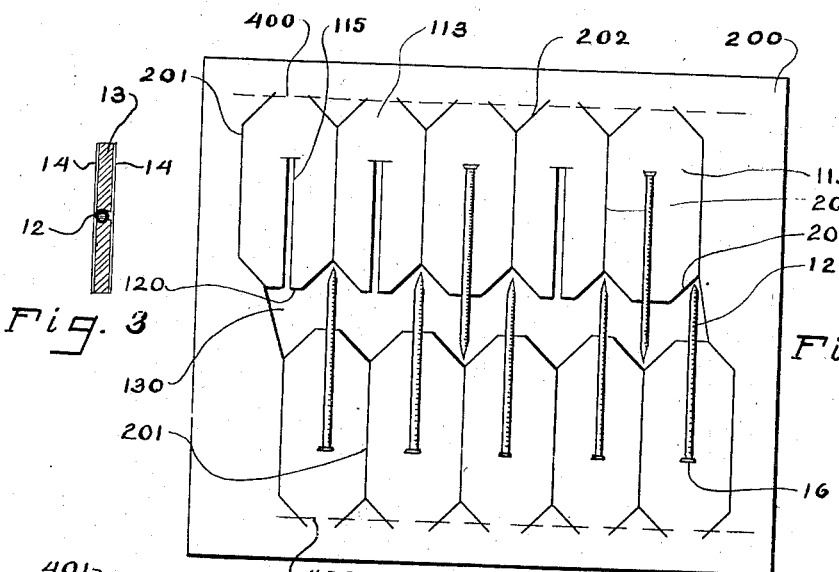
Figure 3 is a cross sectional view taken along line 3—3 of Figure 1.
Figure 4 is a plan view of a ten-up cardboard core piece for use in the manufacture of the corn cob holder of my invention.

Referring now to Figures 1, 2, and 3, the novel corn cob holder 10 shown therein has a manual grasping or handle portion 11 which comprises a central core sheet or lamination 13 and outer covering laminations 14—14.

The central core sheet or lamination 13 has a longitudinal slot 15 therein communicating with the edge 20 thereof.

A nail 12 is embedded in the slot 15 so that the head 16 thereof is engaged at the near end of the slot 15, while the point thereof projects beyond the end 20 of the core sheet 13.

The covering sheets 14—14 are secured to the outer surfaces of the sheet 13 in any suitable manner; preferably, they are adhesively secured thereto.

The covering sheets 14 may be printed in any suitable manner with any desired advertising legend and may also have any suitable descriptive material printed thereon or may be formed in any shape suitable for the particular advertisement to be placed thereon.

The removal of the nail 12 from the core sheet 13 is prevented by the fact that the head 16 of the nail is substantially wedged within the slot 16 in which the nail is embedded.

In order to reinforce the end 21 of the handle portion 11, a wire staple 22 may be placed therein, the said wire staple passing through all of the laminations of the handle piece. The wire staple 22 thus provides reinforcement against any twisting motion which may normally occur during the use of the corn cob holder.

The nail 12 is thus securely embedded in the core sheet 13 not merely by the fact that it is held within the slot 15, but also by reason of the fact that the covering sheets encase the nail on those surfaces thereof which are not embraced by the walls of the slot. And also the wire staple 22 serves further to position the nail and prevent accidental or unintended removal thereof from the slot or the core sheet.

While I have shown the handle 11 of my corn cob holder as of elongated octagonal shape, the shape thereof may be varied in any suitable manner for advertising purposes. Thus the core sheet 13 and the covering sheets 14, 14 may be cut out in the shape of an ear of corn for the corn grower; the members may have a pickle shape for the condiment maker; or the sheets may be cut out to simulate a bread for the baker.

Various other formations which may be utilized in connected with the advertising matter on the handle will, of course, now be obvious.

It is only sufficient in the construction of the device of the present invention to ensure that the core sheet 13 and the coterminous cover sheets 14, 14 will have a sufficient area to provide a simple handle which may readily be grasped and held for the purposes which I have described.

In actual use, two of the corn cob holders of the present invention are to be used simultaneously. The point of the nail 12 of each of the corn cob holders is to be inserted in the end of the corn cob, the handle being pushed in until the end 20 of the core piece 13 abuts the outer surface of the end of the corn cob. The corn cob may then be handled without difficulty by manually grasping the handle portions 11 of the corn cob holders.

The present device lends itself readily to quantity manufacture in a simplified manner. Thus, for instance, as shown in Figure 4, the corn cob holders may be manufactured in groups of varying number. In the construction shown a ten-up cardboard core piece is being manufactured. The sheet 200 is cut in a suitable manner along the lines 201, 201 which define the lateral boundaries of the core sheet 113, which is later to become core sheet 13 of the corn cob holder handle 11.

The same sheet 200 is likewise cut along the lines 202, 202 which are also to define corresponding boundaries of the core sheet 13 of the finished corn cob holder; and also the sheet 200 is simultaneously cut along the lines 120, 120 which correspond to the boundary 20 of the sheet 13 of the finished corn cob holder. At the same time and during the same cutting operation, the slots 115 are excised from the sheet 200, the said slots 115 being placed in proper relations to the cuts along the lines 201, in order to ensure that the slot 15 in the finished corn cob holder will be in proper position.

The cutting of the sheet along the lines 202—120 will result in the cutting out of the central portion 130 of the core sheet 200. This facilitates the placement of the nail 12 in proper position within the slots 115, so that they are embedded therein. In the ordinary practice of my invention, the nails 12 are simply pressed into the slot so that the heads 16 thereof enter into a portion of the material of the sheet 200. The heads 16, as has been previously pointed out, are preferably wedged within the slots 15 in order to ensure that the nail will not be readily withdrawn in case of longitudinal tension.

Figure 5:
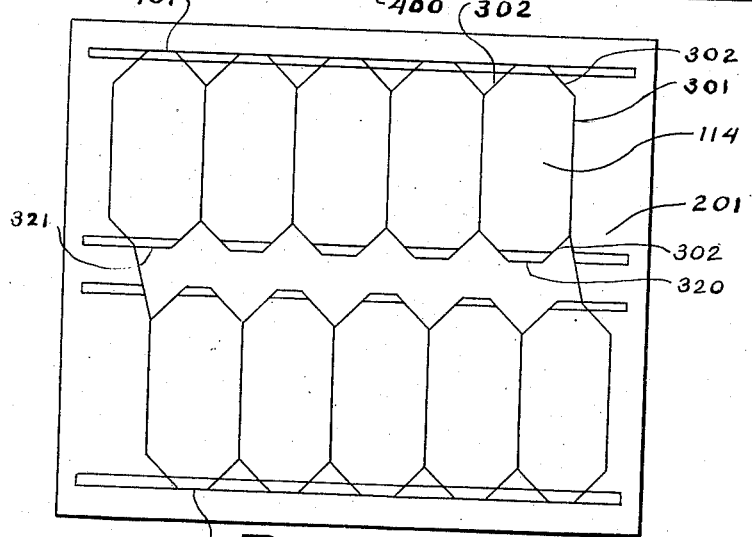
Figure 5 is a plan view of a ten-up covering lamination for use in the construction of my corn cob holder.

After the nails have been embedded in the slots 115, in the manner shown in Figure 4, the covering sheets may be applied. The covering sheet may likewise be formed in ten-up formation as shown in Figure 5, or in any other suitable gang formation corresponding to that of the core piece of Figure 4. The sheet 201, which is to form the covering sheet is first cut along the lines 302, 301, 320, defining the sections 114. The sheet 201 is then adhesively secured to the sheet 200 so that the sections 114 thereof are exactly alined with the sections 113 of the core sheet 200.

Obviously, covering sheets 201 are placed on either side of the core sheet 200, in order to secure complete covering of both sides of the manufactured corn cob holder.

After the adhesive securement of the covering sheets 201 to the core sheet 200 is effected, then the wire staple may be passed through each section so that it surrounds the nail and serves further to bind together and reinforce all of the laminations at the edge where the nail projects from the laminated members into the core 130.

The combined sheets 200, 201 may now be cut along the lines 400, 401. Each cutting operation will thus result in the severing of the corn cob holder sections from the composite laminar sheet, thus producing the corn cob holder members of Figure 1.

In the foregoing, I have described a simple construction for a corn cob holder which lends itself readily for use as an advertising novelty. The covering sheets may have any suitable legend imprinted thereon. The handle of the device may take any form suitable for the particular purpose or for the particular advertising matter printed on the covering sheet. Instead of a single tine or prong, a plurality of tines may be formed in the device in the manner herein above described, each of the tines being held in its own slot.

While the device is preferably to be used as a corn cob holder and is peculiarly shaped for this purpose, it may obviously be utilized wherever a tine or prong is to be held on a suitable handle, and wherever a tine or prong or a plurality of such members is to be embedded into an object, and wherever a handle of any suitable formation is required for said tine or prong.

Many other uses of the devices of the present invention should be obvious to those skilled in the art and many other methods of constructing the same or shaping or forming the said device should also be obvious. Accordingly, I should prefer to be bound, not by the specific disclosures here, but only by the appended claims.

I claim:

1. A corn cob holder having a handle portion and a tine, said handle portion being formed from laminar sheet material and having a central lamination and outer laminations, a slot in said central lamination, a portion of said tine being encased within said slot.

2. A corn cob holder having a handle portion and a tine, said handle portion being formed from laminar sheet material and having a central lamination and outer laminations, a slot in said central lamination, a portion of said tine being encased within said slot, the point of said tine projecting from one end of said laminar sheet, said tine having a head portion, said head being embedded in said central lamination.

3. A corn cob holder having a handle portion and a tine, said handle portion being formed from laminar sheet material and having a central lamination and outer laminations, a slot in said central lamination, a portion of said tine being encased within said slot, the point of said tine projecting from one end of said laminar sheet, said tine having a head portion, said head being embedded in said central lamination, and fastening means through said laminations at the end from which said point projects.

4. A corn cob holder having a handle portion and a tine, said handle portion being formed from laminar sheet material and having a central lamination and outer laminations, a slot in said central lamination, a portion of said tine being encased within said slot, the point of said tine projecting from one end of said laminar sheet, said tine having a head portion, said head being embedded in said central lamination, and a staple through said laminations at the end from which said point projects.

5. A corn cob holder having a handle portion and a tine, said handle portion being formed from laminar sheet material and having a central lamination and outer laminations, a slot in said central lamination, a portion of said tine being encased within said slot, the point of said tine projecting from one end of said laminar sheet, said tine having a head portion, said head being embedded in said central lamination, the outer surface of the outer laminations providing space for advertising matter.

6. The method of forming a corn cob holder comprising the steps of partially cutting a plurality of central handle portions from a sheet, partially cutting a corresponding number of outer laminations therefor from each of two other sheets, embedding a tine in each of the central handle portions; securing the outer sheets to each surface of the central sheet; and completing the cutting operation severing the corn-cob holders from the said sheets.

MALVIN LICHTER.